(12) United States Patent
Howell

(10) Patent No.: US 7,658,505 B2
(45) Date of Patent: *Feb. 9, 2010

(54) MODULAR TEMPORARY LIGHTING ASSEMBLY

(76) Inventor: Jay E. Howell, 5717 Island Dr., Pardeeville, WI (US) 53954

( * ) Notice: Subject to any disclaimer, the term of this patent is extended or adjusted under 35 U.S.C. 154(b) by 0 days.

This patent is subject to a terminal disclaimer.

(21) Appl. No.: 11/444,872

(22) Filed: Jun. 1, 2006

(65) Prior Publication Data

US 2006/0221622 A1     Oct. 5, 2006

Related U.S. Application Data

(63) Continuation-in-part of application No. 10/805,015, filed on Mar. 19, 2004, now Pat. No. 7,066,616.

(60) Provisional application No. 60/480,340, filed on Jun. 20, 2003.

(51) Int. Cl.
    *F21S 8/00*     (2006.01)

(52) U.S. Cl. .................. 362/147; 362/391; 362/647; 439/652

(58) Field of Classification Search ........ 362/391, 362/640, 647, 648, 652, 657–659, 147; 439/375, 439/541, 602, 605, 650–652
See application file for complete search history.

(56) References Cited

U.S. PATENT DOCUMENTS

| | | | |
|---|---|---|---|
| 4,141,062 A | 2/1979 | Trueblood | 362/400 |
| 4,310,874 A | 1/1982 | Spiteri | 362/251 |
| 4,321,660 A | 3/1982 | Sokol | 362/368 |
| 4,399,371 A | 8/1983 | Ziff | 307/147 |
| 4,421,368 A | 12/1983 | Saban | 439/83 |
| 4,639,842 A | 1/1987 | Upchurch | 362/376 |
| 4,653,829 A | 3/1987 | LaMont | 439/409 |
| 4,717,348 A | 1/1988 | Mazzullo | 439/76.1 |
| 4,774,647 A | 9/1988 | Kovacik | 362/295 |
| 4,775,802 A | 10/1988 | Dods | 307/147 |
| 4,841,420 A | 6/1989 | Baggio | 362/249 |

(Continued)

OTHER PUBLICATIONS

National Electric Code Article 590 for Temporary Installation, published.2008.

(Continued)

*Primary Examiner*—Jason Moon Han
(74) *Attorney, Agent, or Firm*—Jeffrey S. Sokol; Cook & Franke SC

(57) ABSTRACT

A modular temporary lighting assembly and multi-outlet stringer particularly suited for building construction settings. The assembly is formed by connecting a plurality of like-shaped stringers and a plurality of like-shaped multi-outlet receptacles. Each of the several section of the assembly includes one stringer and one receptacle. Each stringer has a two or three-prong twist-lock plug at one end, and a two or three-port twist-lock outlet at the other. Each receptacle has a light socket, one male twist-lock plug, three female twist-lock outlets, and a mounting hook. The receptacles are hung along the ceiling of the building and electrically connected by the stringers. The sections of the lighting assembly are connected in a single linear routing or a multi-branch pattern throughout the desired areas of the building. Each receptacle has a supply stringer that supplies it with electric power, and two or more feed stringers that supply power to other receptacles.

11 Claims, 11 Drawing Sheets

U.S. PATENT DOCUMENTS

| | | | |
|---|---|---|---|
| 4,864,477 A | 9/1989 | Engelman | 362/376 |
| 4,904,195 A | 2/1990 | Thackeray | 439/173 |
| 5,003,227 A | 3/1991 | Nilssen | 315/161 |
| 5,154,511 A | 10/1992 | Venesky | 362/282 |
| 5,257,172 A | 10/1993 | Erickson | 362/657 |
| 5,452,194 A | 9/1995 | Phalen | 362/376 |
| 5,733,037 A | 3/1998 | Tennis | 362/249 |
| 5,857,875 A | 1/1999 | Hsu | 439/652 |
| 6,024,588 A | 2/2000 | Hsu | 439/173 |
| 6,039,458 A | 3/2000 | Coates, Jr. | 362/249 |
| 6,062,884 A | 5/2000 | Messimer | 439/172 |
| 6,095,861 A | 8/2000 | Lin | 439/607 |
| 6,170,966 B1 | 1/2001 | Schwarzmann | 362/376 |
| D439,697 S | 3/2001 | Klaus | D26/119 |
| 6,319,056 B1 | 11/2001 | Schunk | 439/505 |
| 6,964,504 B2 | 11/2005 | Newbold | 362/375 |
| 7,066,616 B2 * | 6/2006 | Howell | 362/145 |

OTHER PUBLICATIONS

OSHA standard 29 C.F.R. 1926.405(a)(2) for Temporary Wiring, published Jan. 27, 2009.

* cited by examiner

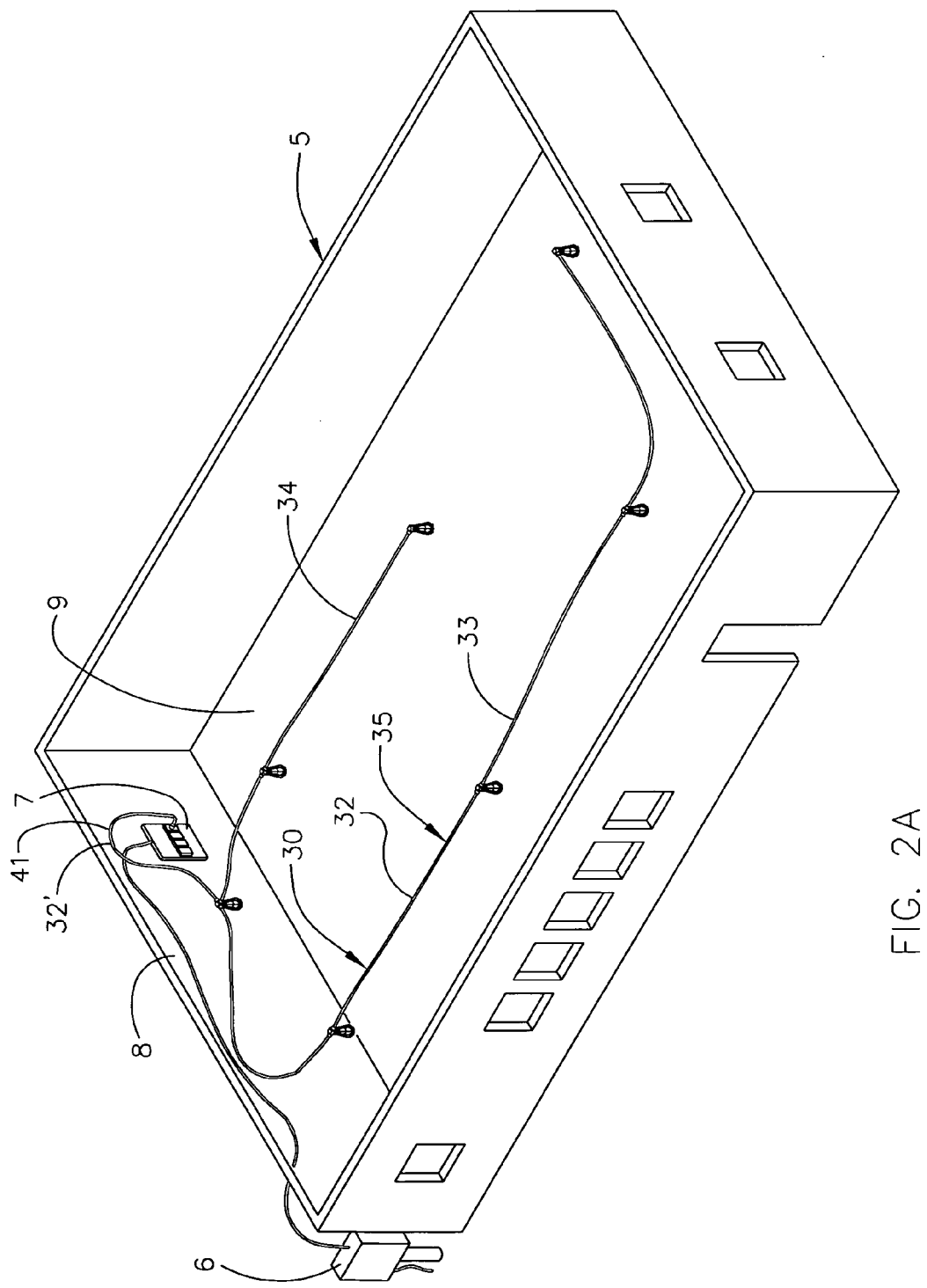

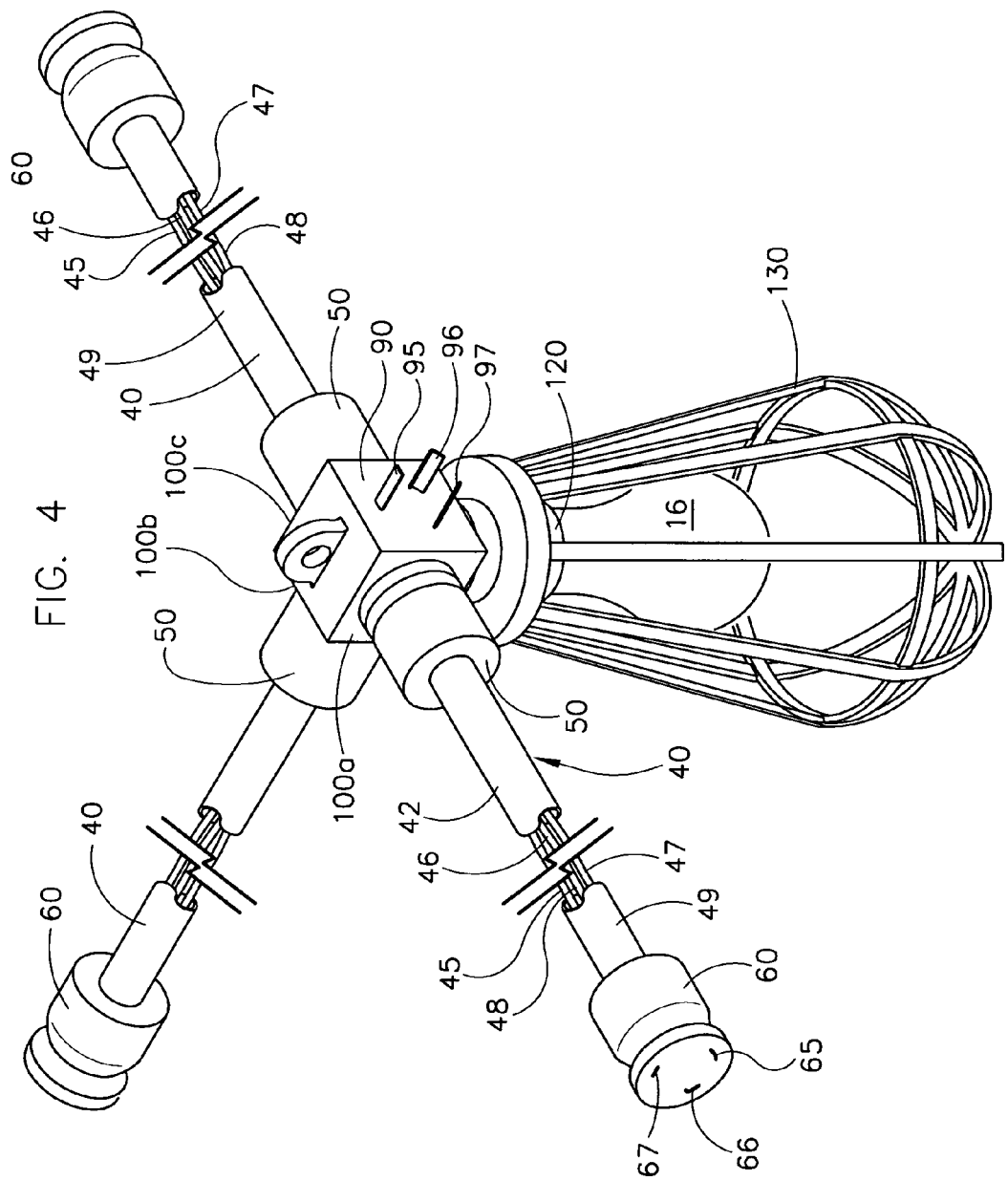

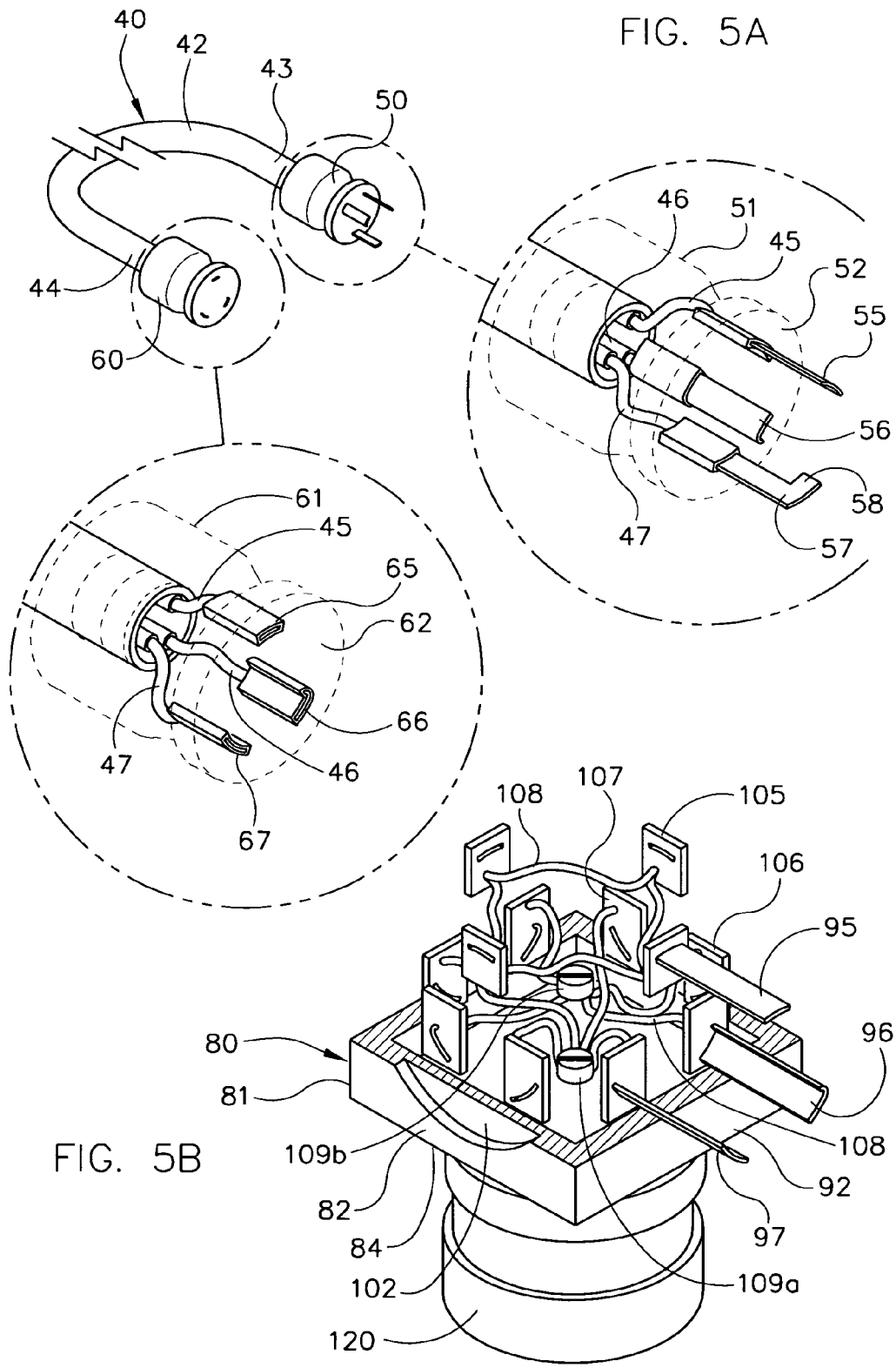

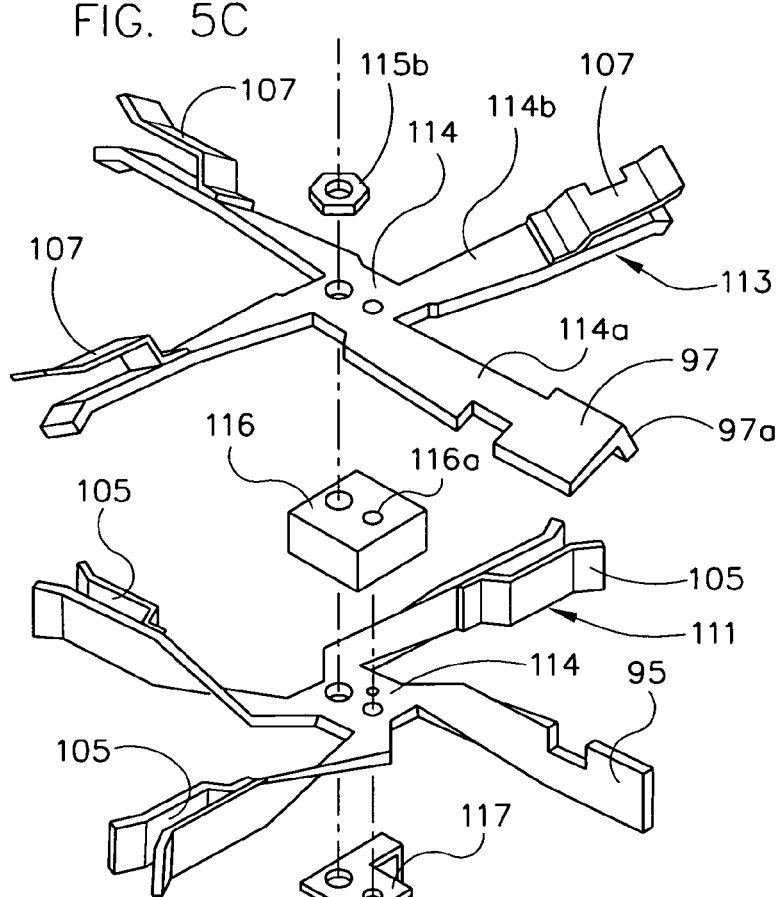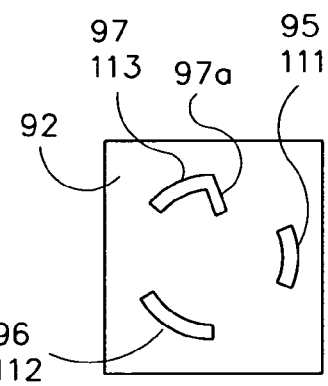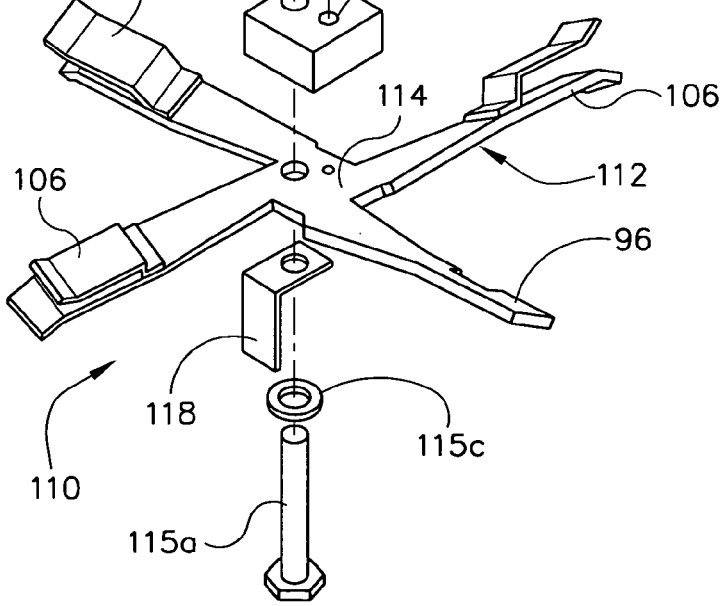

MODULAR TEMPORARY LIGHTING ASSEMBLY

CROSS-REFERENCE TO RELATED APPLICATION

This application is a Continuation-In-Part of U.S. patent application Ser. No. 10/805,015, filed Mar. 19, 2004, now U.S. Pat. No. 7,066,616, and claims priority on U.S. Provisional Patent Application No. 60/480,340, filed Jun. 20, 2003.

TECHNICAL FIELD OF THE INVENTION

The present invention relates to a modular temporary lighting assembly that is particularly suited for building construction settings to light the interior of the building, that is easy to install in a variety of routing configurations that can be modified during construction, and is easy to remove for reuse even when a section of the assembly becomes intertwined with or blocked by permanent building components.

BACKGROUND OF THE INVENTION

The construction of a building requires the coordination of a variety of specialized work. The ground is excavated and the foundation is poured. The outer walls and roof are erected, and the framing of the interior walls are roughed in. The plumbing, electrical wiring, heating and ventilation, and other concealed or built in components and features are installed. Industrial buildings often have large pieces of equipment that need to be set in place and hooked up to the electrical, water and pneumatic systems in the building. Residential and commercial buildings require additional work such as installing insulation, drywall, cabinets, finished floor coverings and woodwork, as well as painting are frequently done before the permanent electrical system is operating for the building. During construction, electric power is typically provided in the form of a temporary 120-volt, 200-amp service to run tools and equipment and provide necessary lighting to the interior of the building. Temporary pedestals are connected to this service and installed at desired locations around the building. The pedestals are frequently 200 feet apart and are equipped with a 20-amp breaker. Temporary lighting is run from the pedestals to provide a safely lit and productive environment for the workers during the construction of the interior of the building.

Temporary construction lighting stringers typically take the form of relatively long, continuous, electric cords with a number of integrally attached light fixtures that are evenly spaced along the length of the stringer. The stringers are pre-assembled with each fixture secured to the cord. The stringers join the lights in series and are typically sold in 50 to 100 feet long strands with a light fixture every 10 feet. Many stringers have a conventional three-prong male plug at one end for plugging into an outlet of one of the temporary pedestals. The stringers need to provide enough light for the larger areas of a building, and to reach the more remote locations in the building relative to the pedestals. Stringers plugged into adjacent pedestals should be able to light the area between those pedestals. The routing of a conventional stringer through a building is shown in FIG. 1. Stringers are typically not removed until toward the end of the construction of the interior of the building.

A problem with temporary construction lighting stringers is that they are used once and discarded. Because different work is done by different contractors at different times throughout the construction of a building, the interior walls, electric wiring, plumbing, ductwork, and other components are installed around and intertwined with the lighting stringers. The relatively large lighting fixtures frequently do not fit through the small openings between the wall framing and other components through which the electric cord of the stringer extends. The cord also becomes intertwined with the permanent wiring for the electrical, telephone, fire and security systems for the building. Removing the stringers is often rendered impractical without cutting or otherwise destroying the cord. Yet, when the cord is cut, the entire stringer is rendered unusable. To perform work quickly, lighting contractors and their workers typically do not have or take the time to untangle the cord or detach and reattach obstructed fixtures in order to remove a stringer. The lighting contractor will also not want to interfere with the wiring of the other contractors in order to remove a stringer. The stringer is simply cut and discarded. While splicing the stringer back together may be permitted under Article 527.4(G), OSHA inspectors typically frown on temporary light stringers with numerous splices because of the increased safety risk the splices pose. Yet, expensive temporary stringers that have been used on more than one job site often have many splice points, which increases the risk of a hazardous situation. As a result, new stringers are needed for each construction site, and the waist is added in to the construction costs. Unfortunately, workers and foremen can be unduly frugal with installing temporary lighting in order to keep costs to a minimum. In some instances, the necessary stringers for appropriate lighting may only be installed after an accident occurs or a safety inspector requires additional lighting.

Another problem with conventional construction lighting stringers is that they come in a unitary strand having a length 50 to 100 feet. Some stringers are initially hung to provide general lighting for the relatively open interior area of the building after the roof and outer walls are erected. These stringers are often too far from a specific area where detailed work needs to be done or become obscured by the interior walls and other components in the building. Yet, the stringers can become stuck or intertwined with other components as the construction of the interior progresses. Instead of simply moving or rerouting an existing stringer, additional stringers need to be added and routed to specific areas throughout the construction process as interior lighting needs change. The need to reroute stringers can be particularly important when the interior rooms take form and lighting is needed in each room. The unitary strand or lights must be routed from one room to another, and into and out of each room as in FIG. 1. Even a long strand will quickly be used up. The stringers cannot properly light the areas near the pedestal and the more remote rooms relative to the pedestal. Although additional stringers can be plugged directly into the pedestal or into a receptacle at the end of an existing stringer, the additional stringers can overload the 20 amp breaker in the pedestal, increase construction costs and be a nuisance or safety hazard to the workers. The additional stringers can be particularly troublesome when they are routed through doorways, walkways or openings used by the workers or overload the electrical capacity of a particular pedestal.

A further problem with construction lighting stringers is that they must be reliable and easy to install and remove. The stringers must be able to withstand considerable physical and environmental abuse. The electric connections between the electric cords and light fixtures need to be firm so that they are not jarred lose during rugged use. Yet, the need for durability and reliability conflicts with the ease with which the stringers and fixtures are installed and removed. Although some construction stringers have been developed to help remove the light fixtures, the fixtures are in practice too difficult to remove and properly reinstall in a safe and reliable manner. An example of such a stringer is shown in U.S. Pat. No. 6,425,682 and D439,697, the disclosures of which is incorporated by reference. These stringers are preassembled by the manufacturer with light fixtures attached to the cord about every ten feet. The fixtures have clamps with electrical contacts that pierce the two spaced electrical cords to form the electrical contact with the wires and necessary firm securement to the cord. These clamps must be opened to remove the fixture from the cord, which exposes the existing holes in the cord and creates a potential for a short circuit or safety risk if the holes are not properly covered due to an oversight due to a busy construction setting. If the fixture is reattached at a different location on the cord, then the cord has to be cut between the two wires so that the wires can be spread apart for reattachment to the spaced clamps of the fixture. Should the knife slip, one of the electrical wires can be severed or the worker can be injured. Reattachment is often unreliable because one or both of the contacts of the clamp do not pierce and firmly engage their respective wire. As a result, workers typically view removing and reattaching the light fixtures as unproductive and simply add another stringer. As noted above, adding new stringers in lieu of rerouting an existing stringer increases construction costs and can overload the pedestal breaker. The additional stringers will also need to be cut and discarded at the end of the construction project if they become stuck or intertwined and difficult to remove.

A still further problem with construction lighting stringers is that they must comply with specific construction code requirements such as the OSHA standard 29 C.F.R. 1926.405 (a)(2) for Temporary Wiring, and the National Electric Code Articles 305 and 527 for Temporary Wiring and Temporary Installations, respectively. These codes require temporary lighting assembles to be approved for the conditions in which they are being applied (Article 527.2 (B), have feeders and branch circuits with hard usage type cords (Article 527.4 (C), and meet specific slicing requirements. (Article 527.4 (G)). The codes also prohibit temporary lighting from have receptacles, particularly if the temporary lighting system has an ungrounded conductor. (Article 527.4 (D)). The reason for this code requirement is believed to be to prevent the temporary lighting from providing standard configuration receptacles that would allow workers to plug in an electric tool, battery charger, radio, or the like, which could create a safety concern.

Conventional trouble lights are not appropriate for construction settings because they do not comply with OSHA and National Electric Code requirements. Examples of conventional trouble lights are provided in U.S. Pat. Nos. 6,425,682, 5,257,172 and 5,154,511, the disclosures of which are incorporated by reference. Trouble lights are not typically designed for hard use as required by Article 527.4(C). The cord is not physically tough enough, so that the cord and its conductive wires could be damaged or cut should the cord be struck by a hammer or passed over a sharp edge. The trouble lights that provide a receptacle have a standard outlet configuration in violation of Article 527.4(D). The standard outlet configuration allows workers to plug in a tool or piece of equipment with a standard prong configuration into the receptacle of the trouble light, which creates a potential safety hazard. The wiring or circuitry of the trouble light could overheat or short circuit, and cause a blackout or fire. In addition, trouble lights do not provide the necessary lighting capacity needed for a construction setting. Trouble lights often have a lamp with a light bulb shield that limits the emission of light to about or less than 180 degrees. Trouble lights are also usually intended for 100 watt or less bulbs. For these and other reasons, trouble lights would not be appropriate or approved for temporary lighting applications under Article 527.2(B) for the vast majority if not all construction conditions, particularly if they were connected in series or in a multi-branch layout.

The present invention is intended to solve these and other problems.

BRIEF DESCRIPTION OF THE INVENTION

The present invention pertains to a modular temporary lighting assembly and multi-outlet stringer that is particularly suited for building construction settings. The modular lighting assembly is formed by connecting a plurality of like-shaped stringers and a plurality of like-shaped multi-outlet receptacles. The assembly is formed by several sections, with each section including one stringer and one receptacle. Each stringer has a two or three-prong twist-lock plug at one end, and a two or three-port twist-lock outlet at the other. Each receptacle has a light socket, one male twist-lock plug, three female twist-lock outlets, and a mounting hook. The socket receives a light bulb and a removable protection cage. The receptacles are hung along the ceiling of the building and electrically connected by the stringers. The sections of the lighting assembly are connected in a single linear routing or a multi-branch pattern throughout the desired areas of the building. Each receptacle has a supply stringer that supplies it with electric power, and two or more feed stringers that supply power to other receptacles.

One advantage of the present modular temporary lighting assembly is its ease of installation. Depending on the construction setting and the preferences of the workers, the assembly can be installed in at least two different ways. The assembly can be installed one section at a time, with each stinger being connected and each receptacle being hung before the next section of the assembly is installed. The assembly can also be installed by mounting each receptacle before the stringers are installed to connect the assembly together. Both methods of installation avoid the problems associated with conventional unitary lighting stringers that can be 100 feet in length. The individual components of the present assembly are less bulky and heavy so that they are easier to work with, particularly when the worker need to climb up and down a ladder. The worker also does not have to continuously untangle a long stringer as he or she hangs each of the integrally attached light fixtures.

Another advantage of the present modular temporary lighting system is its adaptability. The assembly can adapt to meet both the lighting needs of various construction settings and the changes in the lighting needs of a particular building during its construction. The assembly can be as short as ten feet or as long as is needed to properly light an area without overloading the temporary pedestal. Stringers that are initially hung to provide general lighting for a relatively open interior area can be easily rerouted or added onto to provide lighting to a specific area where detailed work is being done or to avoid an obstruction that is blocking its light from reaching that area. The modular lighting assembly does not become stuck or intertwined with other components as the construction of the interior progresses, which is particularly important when the interior rooms take form and the lighting needs change in each room. The assembly can be routed down a hallway or central area with branches of cord segments feeding off into individual rooms or specific areas. The assembly does not need to double back on itself to provide lighting to individual rooms or areas. As a result, fewer sections of cord, receptacles and light bulbs are needed to effectively light the interior of the building, and the assembly can easily reach the more remote areas of the building from the temporary pedestals. The reduction in sections of stringers, receptacles and light bulbs reduces load on the temporary pedestals, construction costs and any nuisance or safety hazard presented by the lighting assembly.

A further advantage of the present modular temporary lighting assembly is its reusability. Even when internal walls, plumbing and ductwork are built around the lighting assembly or it becomes intertwined with the electrical, fire alarm or telephone system or other components during construction, the modular system can be easily disassembled and removed for reuse. The stringers are simply unplugged from their corresponding receptacles so that both are easily removed without damage. The stringers and receptacles are then available for rerouting at the present construction site or reuse at a different construction project. Any individual stringer that becomes intertwined with the framing and permanent wiring systems can be cut and discarded without wasting the entire stringer assembly. The male plug and female outlet at the ends of each strand are significantly smaller than the receptacles and light fixtures so they are more easily removed. Still, should a single stringer need to be cut to quickly remove the temporary lighting assembly, the majority of the modular components of the assembly are easily removed without damage and are available for reuse.

A still further advantage of the present modular temporary lighting assembly is its durability and reliability. The assembly can withstand considerable physical and environmental abuse. The electric connections between the sections of cord and the receptacles are firm so that they are not jarred lose during rugged use. This durability and reliability is achieved without sacrificing the ease with which the assembly is installed, modified or removed. The twist-lock connections and durable construction of the individual components of the assembly do not require them to be preassembled by the manufacturer. As a result, attaching and removing the individual sections is a simple and productive task that helps reduce waist and construction costs and helps prevent unnecessary overloads to the temporary pedestals.

A still further advantage of the present modular temporary lighting assembly is its compliance with construction codes such as OSHA standard 29 C.F.R. 1926.405(a)(2) for Temporary Wiring, and National Electric Code Articles 305 and 527 for Temporary Wiring and Temporary Installation, respectively. The individual components, sections and the complete lighting assembly meet these code requirements because they are not designed for hard use, include receptacles with a twist lock outlet configurations that help prevent workers from plugging in tools and equipment with standard two or three-prong plug configurations. Were an OSHA representative to object to the use of receptacles with conventional twist lock outlets, the receptacles can be adapted to have a unique outlet configuration that would prevent workers from using a conventional adapter to connect a tool or piece of equipment to the temporary lighting system. Accordingly, the present invention should meet code requirements and be approved for temporary lighting applications, even when they are connected in series or in a multi-branch layout. The modular nature of the assembly eliminates or drastically reduces the need cut apart and then splice the stringers back together. In addition, the lamps allows light emission for a full 360 degrees, and can safely handle a 200 watt bulb so that the lighting capacity needed for a variety of construction settings are easily met.

Other aspects and advantages of the invention will become apparent upon making reference to the specification, claims and drawings.

BRIEF DESCRIPTION OF THE DRAWINGS

FIG. 2A is a top view showing the present modular temporary lighting assembly routed through the interior of a building during a more initial phase of construction to provide temporary lighting to the generally open interior area of the building.

FIG. 4 is a perspective view of the multi-outlet receptacle connected to three feed stingers.

FIG. 5A is a perspective view of a stringer section showing enlarged cut away views of the male plug and female outlet.

FIG. 5B is a perspective cut away view of a three-prong embodiment of a receptacle showing its internal electrical terminals and connections.

FIG. 5C is an exploded view of the internal components of another three-prong embodiment of the receptacle.

FIG. 5D is a side view of the receptacle showing the orientation of a twist lock plug.

DESCRIPTION OF THE PREFERRED EMBODIMENTS

While this invention is susceptible of embodiments in many different forms, the drawings show and the specification describes in detail a preferred embodiment of the invention. It should be understood that the drawings and specification are to be considered an exemplification of the principles of the invention. They are not intended to limit the broad aspects of the invention to the embodiment illustrated.

Figure 1A:
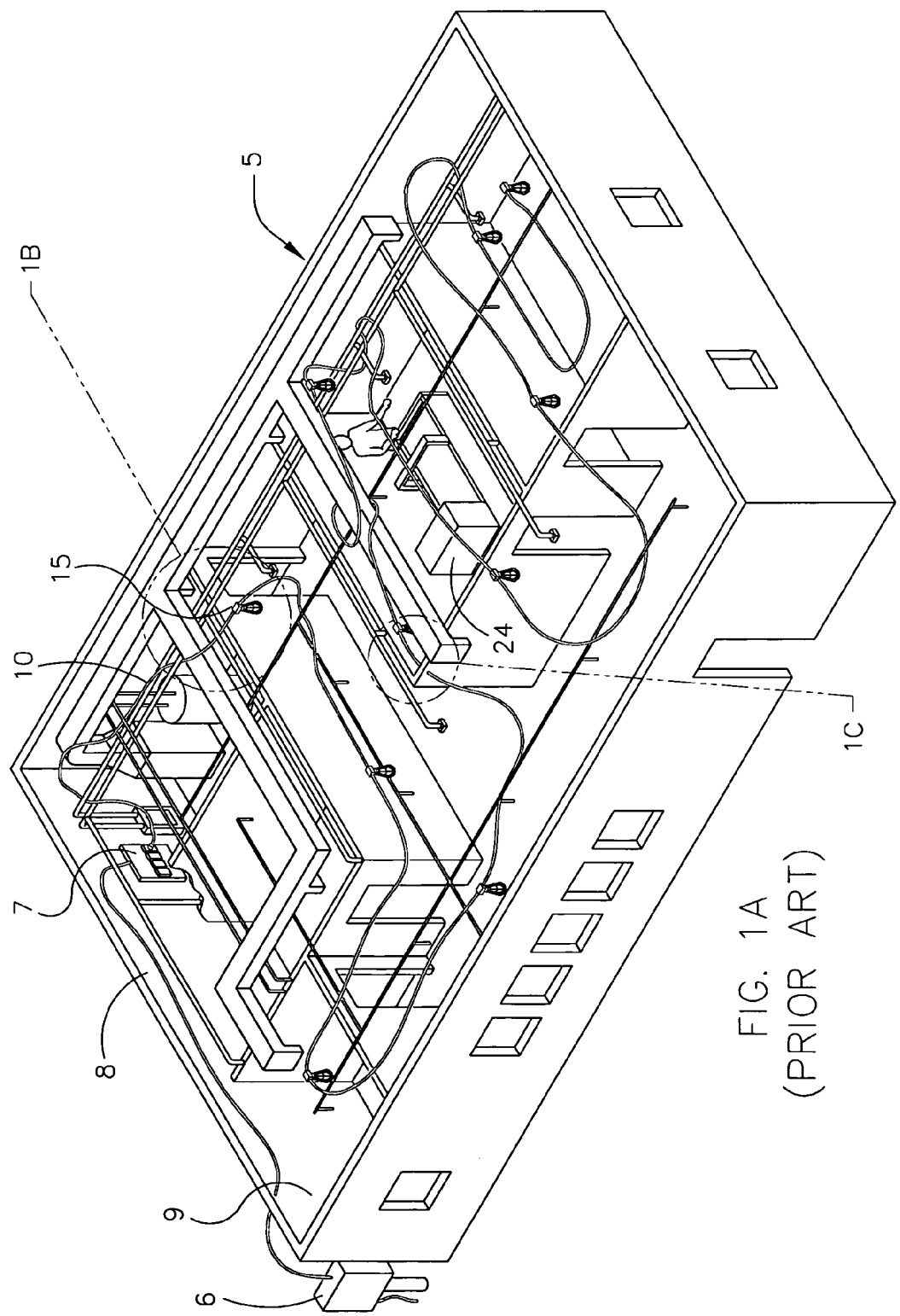
FIG. 1 is a top view showing a conventional unitary stringer routed through the interior of a building to provide temporary lighting to various areas of the building, and showing the stringer intertwined with permanent wiring and blocked by the wall framing so that the stringer cannot be easily removed without cutting and destroying the entire unitary stringer.
Figure 1B:
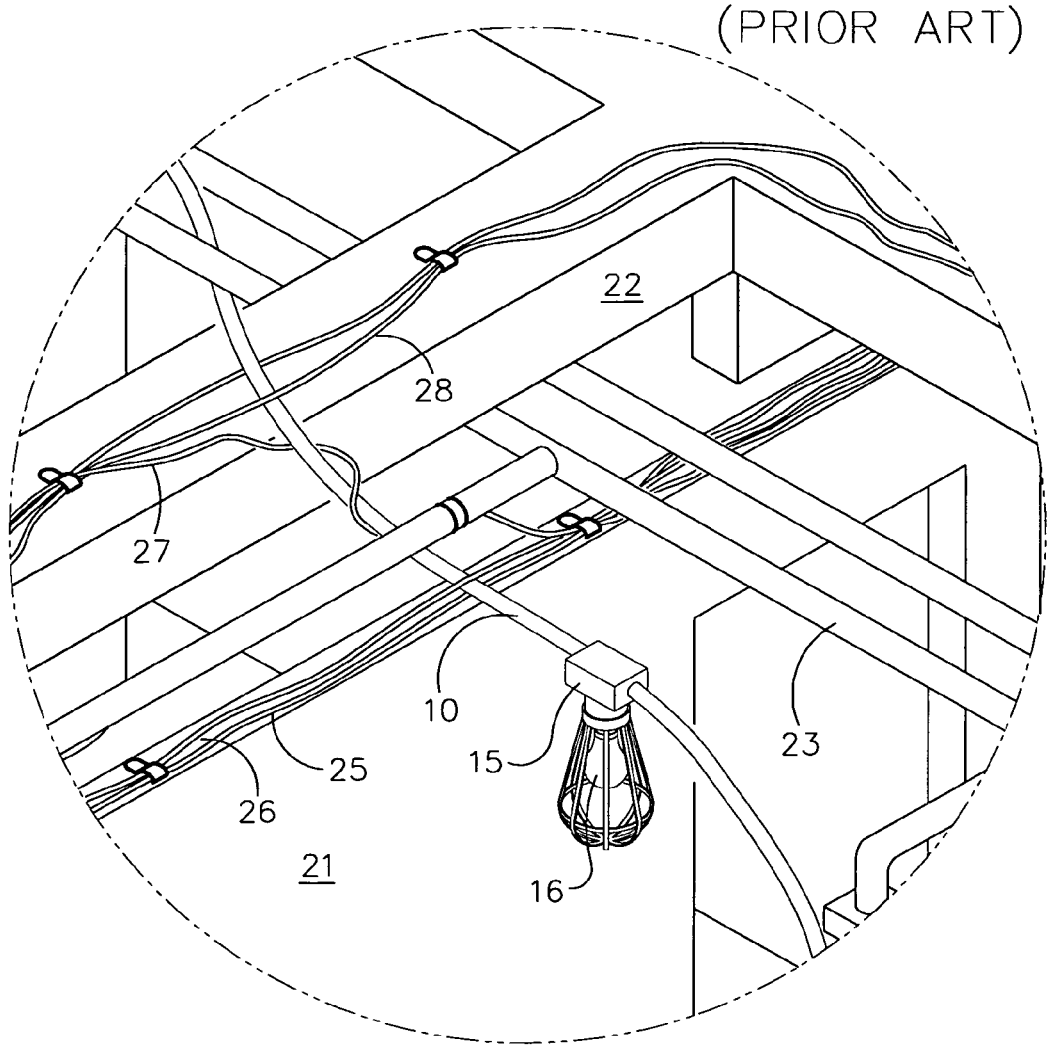
Figure 1C:
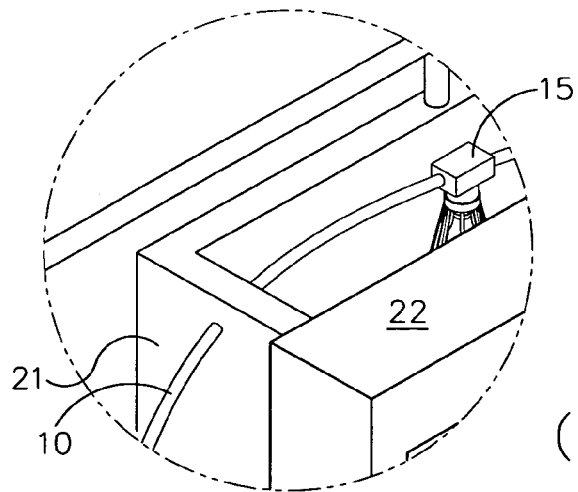

Toward the beginning of the construction of a building 5, a local electric utility company hooks up a temporary service box 6 to provide electric power to the construction site shown in FIG. 1. One or more temporary pedestals 7 are electrically connected to the service box 6. The pedestals 7 are typically located on the inside of an outer wall 8. The outer walls 8 and roof define the interior 9 of the building 5. During the construction of the interior 9 of the building 5, one or more conventional temporary lighting stringer 10 are installed to provide the necessary lighting. Conventional stringers 10 with integrally attached light fixtures 15 are routed in a linear manner through the interior of the building as in FIG. 1. Each fixture 15 has a conventional incandescent light bulb 16. The framing for the interior walls 21 is then roughed in, and the heating, ventilation and air conditioning (HVAC) 22, plumbing 23, electrical wiring 25-28, equipment 29, and the many other desired components and features are installed inside the building 5. The framing, wiring and other components frequently become intertwined with the temporary stringer 10 and inhibit its rerouting during the construction process or its removal after the interior 9 is complete or the permanent electrical system is operating.

Figure 2B:
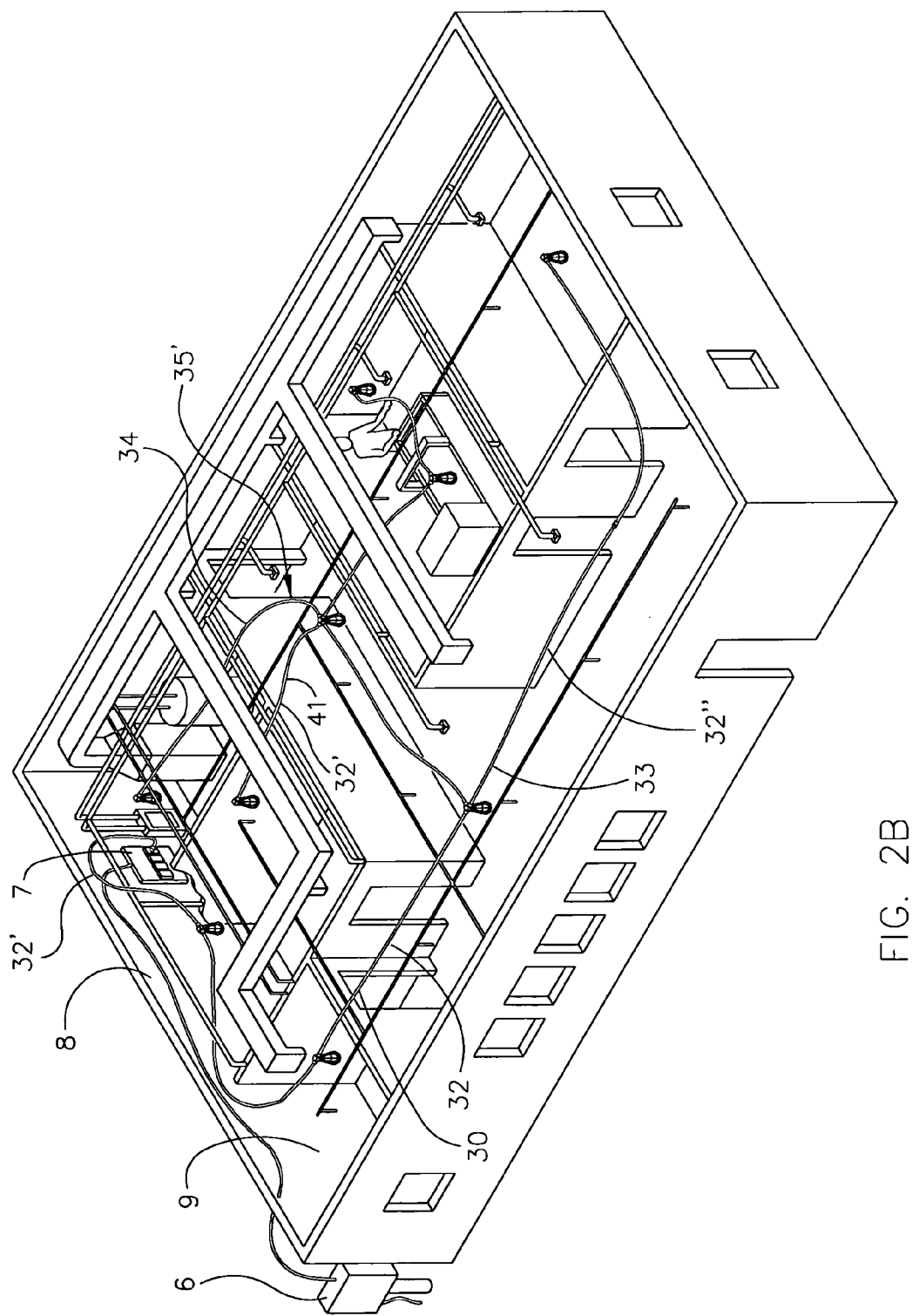
FIG. 2B is a top view showing the present modular temporary lighting assembly after its routing has been modified during a more complete phase of construction to provide appropriate temporary lighting to more specific areas of the building.

The present invention relates to a modular temporary lighting assembly generally indicated by reference number 30 and shown in FIGS. 2A and 2B. The assembly 30 has a number of individual sections or segments 32 that are joined together in an electrically linked manner as discussed below. The sections 32 form a main or trunk line 33 and one or more branches 34 to form a desired multi-branch routing pattern 35. The modular assembly 30 is initially linked together to form a desired routing 35 to provide lighting to the desired area or areas of the building. During the initial stage of the construction of the interior 9, the area tends to be a large open area as in FIG. 2A. The stringer is routed to provide lighting to this area. During the later stages of the construction of the interior 9, the large open area is typically divided by interior walls 21 and other physical structures into more defined areas or rooms as in FIG. 2B. The routing 35 of the assembly 30 is easily modified during the later stages of construction to form a different routing 35' in an electrically linked manner to provide additional lighting to the more specific areas where work is being performed. In each routing 35 or 35', the sections 32 are joined together in an electrically linked manner so that electricity flows from the pedestal 7 through each section 32 of the assembly 30. One or more branches of the routing 35 are removed to make way for the more specific lighting needs or to remove the assembly 30 from areas where little or no work is being performed. Although the assembly 30 is shown in the form of a multi-branch routing 35, it should be understood that the individual segments 32 can be connected to form a single linear routing free from any branches if desired.

Each section 32 of the assembly 30 includes a stringer 40 and a receptacle 80 having a light bulb. Most of the stringers 40 in the routings 35 and 35' have a standard ten foot length. Yet, the modular design allows the stringers 40 to have different lengths so that the lighting assembly can be adapted to meet the building layout with each room and work area receiving appropriate lighting. The routings 35 and 35' in FIGS. 2A and 2B include shorter stringers 41 with five foot lengths to achieve shorter sections 32' where the light bulbs 16 should be closer together. The routing 35' in FIG. 2B also shows two stringers 40 coupled together to effectively achieve a longer section 32" where the light bulbs do not need to be as close together. Although the stringers 40 and 41 are shown to be five or ten feet in length, it should be understood that they could be provided in a variety of lengths to give the lighting assembly 30 even more installation flexibility without departing from the broad aspects of the invention.

Figure 3:
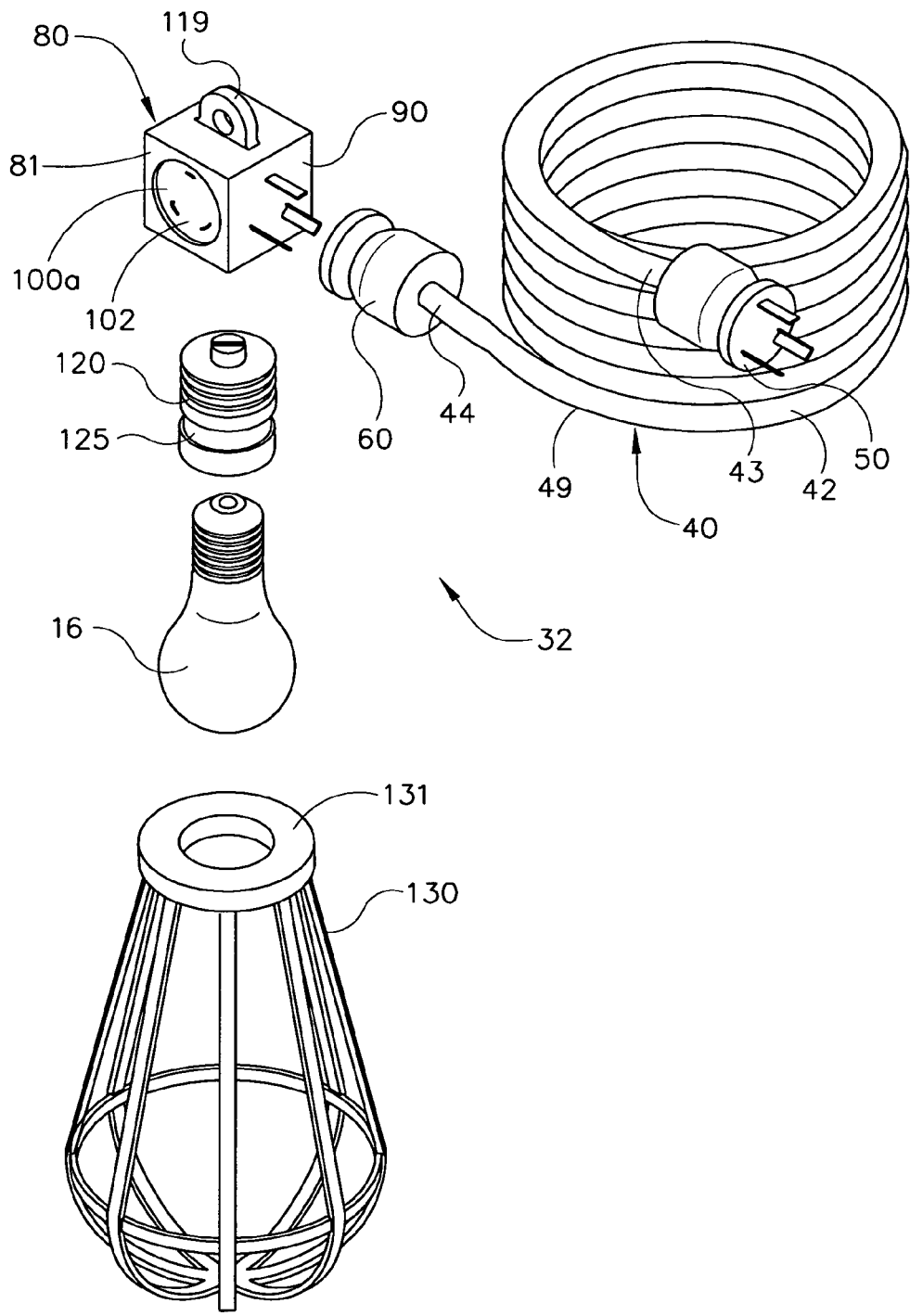
FIG. 3 is an exploded perspective view showing one section of the modular temporary lighting assembly formed by a supply stringer and a receptacle, as well as its light socket, light bulb and protective cage.

Each stringer 40 has a relatively long, thin cord 42 and first and second ends 43 and 44 as shown in FIG. 3. The cord 42 has three wires 45-47 that form the hot, common and ground wires for the stringer 40 as shown in FIGS. 4 and 5A. Each wire 45-47 is wrapped by electric insulation 48 so that it is separated and electrically insulated from the other two wires. The cord 42 includes a conventional plastic outer shell 49 that provides further electrical insulation to protect the wires 46-48 and the workers. The electrical input or feed end 43 of each stringer 40 includes a male plug 50. Each like-shaped plug 50 has an outer insulating shell 51 with a generally tubular shape and a flat face 52 with a circular perimeter. The plugs 50 are preferably conventional twist-lock plugs with three prongs 55-57 that project from the face 52. Each prong 55-57 is made of metal or an otherwise conductive material and is molded into or otherwise rigidly secured or embedded in the plug 50. Each prong 55-57 has an outer finger 58 to lock the plug 50 to an outlet 60, and a contact 59 that electrically connects it to its one respective wire 45, 46 or 47 inside the shell 51 of the plug 50.

The electrical output or supply end 44 of each stringer 40 includes a female outlet 60. Each like-shaped outlet 60 has an outer insulating shell 61 with a generally tubular shape and a flat face 62 with a circular perimeter. The female outlets 60 are preferably conventional twist-lock outlets with three ports 65-67 that extend inwardly from the face 62. The Each port 65-67 has made a metal or an otherwise conductive liner that is molded into or otherwise rigidly secured or embedded in the outlet 60. Each port 65-67 has an inner slot (not shown) for receiving a finger 58 of one prong, and a contact 69 that electrically connects it to its one respective wire 45, 46 or 47 inside the shell 61 of the outlet 60. The prongs 55-57 and ports 65-67 are positioned on their respective plugs 50 and outlets 60 so that the ports of each outlet can matingly receive the prongs of another stringer 40. The twist-lock plugs 50 and outlets 60 operate in a manner similar to the twist-lock device disclosed in U.S. Pat. No. 4,904,195, the disclosure of which is incorporated by reference. The twist-lock plugs 50 and outlets 60 can have a unique configuration that effectively prevents other tools, equipment, battery chargers, radios and the like from being plugged into the temporary lighting assembly 30. One manner of achieving a unique configuration is to position the ports 65-67 of the female outlet 60 and mating prongs 55-57 of the male plug 50 a quarter of an inch further from the center of the outlet or plug.

Each receptacle 80 has a generally cube shaped housing 81 with six sides 82. The nonconductive components of the receptacle 80, such as its housing 81, are made of a durable material such as a hard plastic. The front side includes an electrical input ore male plug 90 with a flat face 92 and three outwardly projecting prongs 95-97 as shown in FIGS. 3 and 4. The ground prong 97 has a locking finger 97a similar to the locking finger 58 of the male plug 50 of each stringer 40. The rear side and two opposed sides each have an electrical output or female outlet 100a, 100b or 100c with a flat face 102 and three inwardly projecting ports 105-107. The ground ports 107 have a locking notch 107a similar to the locking notch 68 of the female plug 60 of each stringer 40. Each of the locking notches lockingly receives the its corresponding locking finger 58 or 97a to securely join the stringer 40 to the receptacle 80 when the two are twist locked together.

In one embodiment of the receptacle 80, the internal electrical connections for the prongs 95-97 and ports 105-107 are made by insulated conductive wires 108 and leads or terminals 109a or 109b as shown in FIG. 5B. The hot prong 95 and each of the three hot ports 105 are electrically connected to hot terminal 109a. The common prong 96 and each of the three common ports 106 are electrically connected to common terminal 109b. The hot terminal 99a electrically connects the hot prong 95 of the feed plug 90 to the hot port 105 of each supply outlet 100a-c. The common terminal 99b electrically connects the common prong 96 of the plug 90 to the common port 106 of each supply outlet 100a-c. A loop of wires 108 electrically connects the ground prong 97 of the feed plug 90 to each of the ground port 107 of each supply outlet 100a-c.

In another embodiment, of the internal components of the receptacle 80 are formed by a bus assembly 110 as shown in FIG. 5C. This buswork 110 has a hot bus 111, a common bus 112 and a ground bus 113. Each bus 111, 112 or 113 is generally X-shaped, and has a central portion 114 and four legs 114a. Each bus 111, 112 or 113 has one leg 114a that forms its male prong 95, 96 or 97, respectively. Each prong 95, 96 and 97 forms an arc about ⅜ inch from a central point on the face 92 of the receptacle 80 with the locking finger 97a of the ground prong 97 turning in toward the center. Each bus also has three legs 114b that form its three female ports 105, 106 or 107. Each female port 105, 106 and 107 defines an outer slot for receiving one of the male prongs. Each slot forms an arc about ⅜ inch from a central point, so that each slot receives one of the prongs 95, 96 or 97 to form an electrical connection between the receptacle 80 and a stringer 40. The busses 111, 112 and 113 are stacked one atop the other, and held together by a fastener including an axially or centrally located, electrically insulative nylon bolt 115a, nut 115b and lock washer 115c. Each bus is spaced and separated from its adjacent bus by an electrically insulative nylon block 116. Each block 116 has an alignment stud 116a on its upper surface. The lower surface of each block 116 has a slightly offset alignment stud (not shown). A hot lead or terminal 117 is located directly beneath and in electrical communication with the hot bus 111 and extends into the light socket 120. A common lead or terminal 118 is located directly beneath and in electrical communication with the common bus 112 and extends into the light socket 120. The alignment studs 116a are received into holes in the busses 111-113 and hot lead 117. The interior of the housing 81 is filled with plastic to further insulate and maintain the alignment of the bussing assembly 110 through a common injection molding procedure.

Each stringer 40 and receptacle 80 has a plug 50 or 90 with similarly oriented prongs 55-57 or 95-97 as shown in FIG. 5D. Each stringer 40 and receptacle 80 also has outlets 60 or 100 with similarly oriented ports 65-67 or 105-107. Each of the plugs 95-97 and ports 105-107 is spaced a common distance of about ⅜ inch from a center point, and rotated 60° relative to its adjacent plugs or ports. Each face 92 or 102 has, its hot plug 95 or port 105 rotated 90° clockwise from top center, its common plug 96 or port 106 rotated 210°, and its ground plug 97 or port 107 rotated 330°. The plug 50 of each stringer 40 can be twist locked and firmly joined to any outlet of any receptacle 80. The outlet 60 of each stringer 40 can be twist locked and firmly joined to the plug 90 of any receptacle 80.

The top side of the receptacle 80 has an outwardly extending hook 110 for mounting or otherwise removably attaching the receptacle 80 to the ceiling or other supporting structure of the building 5. The bottom side of the receptacle is constructed to threadably receive a conventional light socket 120, which is similarly constructed to threadably receive one conventional incandescent light bulb 16. The socket 120 has contacts (not shown) that electrically connect the hot and common terminals 99a and 99b or leads 117a and 117b of the receptacle 80 with the light bulb 16. The socket 120 preferably has an outer channel or circular groove 125 to receive and securably attach a protective cage 130. The cage 130 has a circular base 135 that is removably received by the groove 125. The cage 130 has a framework with a wider middle portion 137 through which the light bulb 16 is inserted prior to threading the bulb into the socket 120. Electric power enters the receptacle 80 through its plug 90 as best shown in FIG. 3. This electric power is sent to operate the light bulb 16 in that receptacle or distributed to other sections 32 of the assembly 30 via the outlets 100a-c of the receptacle as best shown in FIG. 4.

Sections 30 of the assembly 30 are joined together in an electrically linked manner. The stringer 40 and receptacle 80 of each section 32 combine to form a positive or hot line, a neutral line and a ground line. The hot line is formed by a wire 45, prong 55 and port 65 of the stringer 40 and a corresponding prong 95, port 105 and terminal 99a of its corresponding receptacle 80. The neutral line is formed by another wire 46, prong 56 and port 66 in the stringer 40 and a corresponding prong 96, port 106 and terminal 99b in the receptacle 80. The ground line is formed by a wire 47, prong 57 and port 67 of the stringer 40 and a corresponding prong 97, port 107 and metal housing 81 of its corresponding receptacle 80. When the prongs 55-57 of one stringer 40 are plugged into the ports 105-107 of one of the female outlets 100a-c of an adjacent receptacle 80, the hot lines of the adjacent sections are electrically connected to form a continuous hot line, the neutral lines of the adjacent sections are electrically connected to form a continuous neutral line, and the ground lines of the adjacent sections are electrically connected to form a continuous ground line. The continuous hot, neutral and ground lines run in parallel. The hot and neutral lines are electrically connected via the light bulbs 16 and sockets 120 of each section 32. The voltage drop across each socket 120 in the assembly 30 is substantially the same as the voltage drop across the outlet of the pedestal 7. The electric circuit formed by the assembly 30 is complete when one or more bulbs 16 are screwed into their respective sockets 120. Electric current passes from the hot port of the pedestal 7, through the continuous multi-branch hot line of the assembly 30, across the sockets 120 and bulbs 16, into the continuous multi-branch common line of the assembly, and back to the neutral port of the pedestal. The amount of electric current flowing through each bulb 16 is substantially the same so that each light bulb consumes substantially the same amount of electric power and generates substantially the same amount of light.

Two Prong Stringer and Receptacle Assembly

Figure 6:
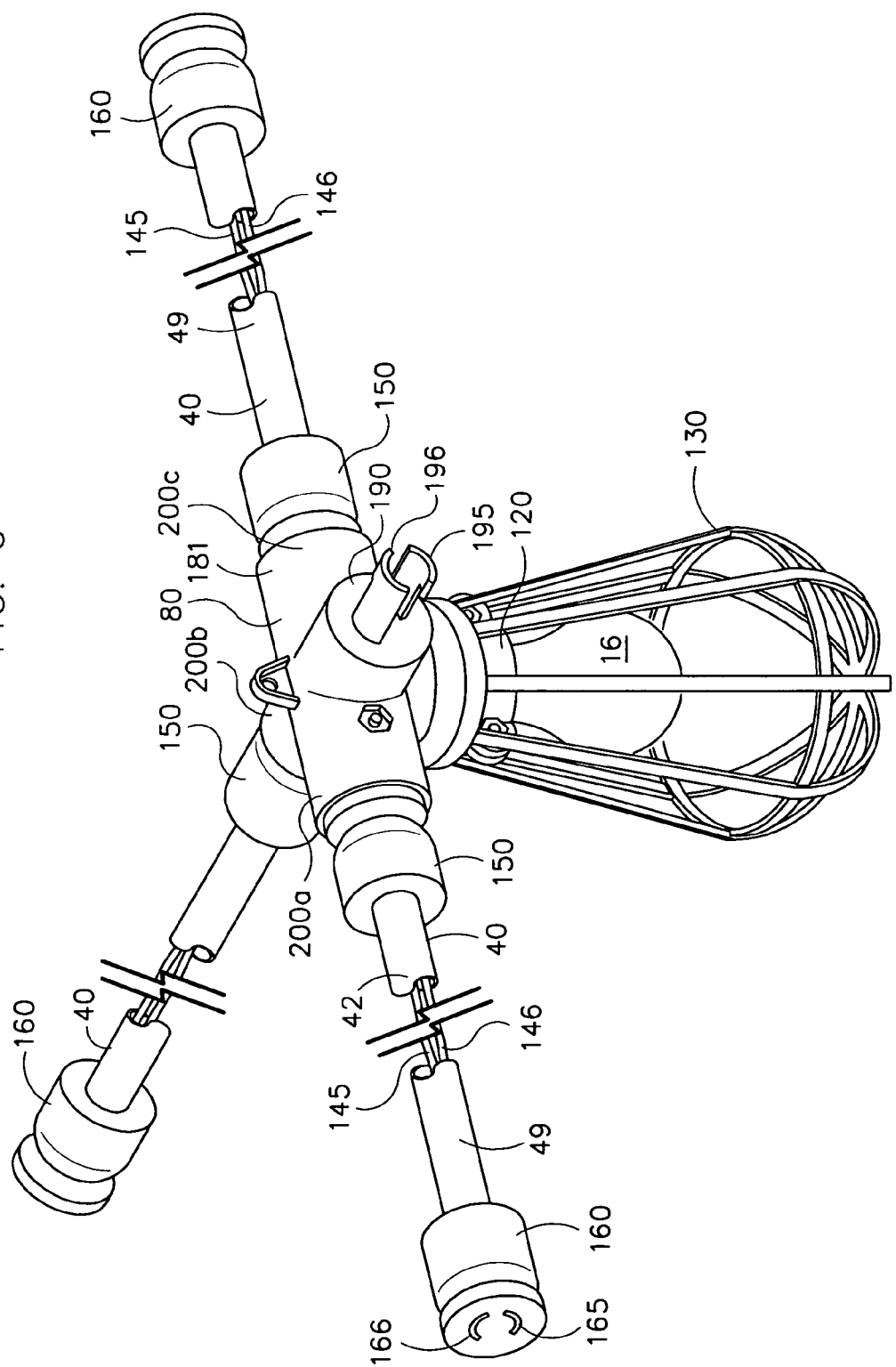
FIG. 6 is a perspective view of a two-prong embodiment of the multi-outlet receptacle connected to three, two-wire feed stingers.
Figure 7A:
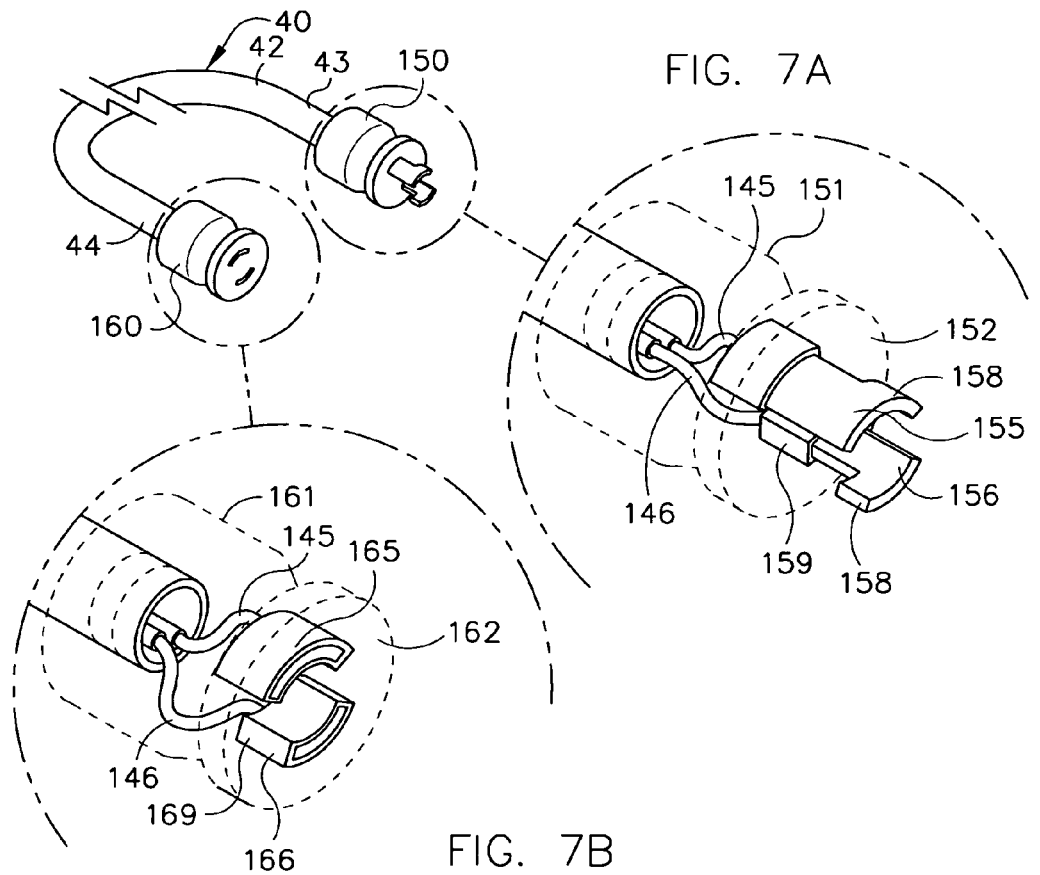
FIG. 7A is a perspective view of a two-prong embodiment of a stringer section showing enlarged cut away views of the male plug and female outlet.

In a two-prong embodiment of the modular temporary lighting assembly 30, each stringer 40 and cord 42 has two wires 145 and 146 that form the hot and common wires as shown in FIGS. 6 and 7A. As with the three-prong stringer embodiment, each wire 145 and 146 is wrapped by electric insulation 48, and the cord 42 includes a conventional plastic outer shell 49. The electrical input or feed end 43 of each stringer 40 includes a male plug 150. Each like-shaped plug 150 has an outer insulating shell 151 with a generally tubular shape and a flat face 152 with a circular perimeter. The plugs 150 are preferably conventional twist-lock plugs with two prongs 155 and 156 that project from the face 152. Each prong 155 and 156 is made of metal or an otherwise conductive material and is molded into or otherwise rigidly secured or embedded in the plug 150. Each prong 155 and 156 has an outer finger 158 to lock the plug 150 to an outlet 160, and a contact 159 that electrically connects it to its one respective wire 145 or 146 inside the shell 151 of the plug 150.

The electrical output or supply end 44 of each stringer 40 includes a female outlet 160. As before, each like-shaped outlet 160 has an outer insulating shell 161 with a generally tubular shape and a flat face 162 with a circular perimeter. The female outlets 160 are preferably conventional twist-lock outlets with two ports 165 and 166 that extend inwardly from the face 162. Each port 165 and 166 is made a metal or an otherwise conductive liner that is molded into or otherwise rigidly secured or embedded in the outlet 160. Each port 165 and 166 has an inner slot 168 for receiving a finger 158 of one prong, and a contact 169 that electrically connects it to its one respective wire 145 or 146 inside the shell 161 of the outlet 160. The prongs 155, 156 and ports 165, 166 are positioned on their respective plugs 150 and outlets 160 so that the ports of each outlet can matingly receive the prongs of another stringer 40. The twist-lock plugs 150 and outlets 160 operate in a manner similar to the three-prong stringer 40. The hot and common prongs and slots have a different size, shape or located to prevent a hot prong from being inserted into a common slot, or visa versa. This difference in size, shape or location keeps common electric line separate from the hot electric line as the stringers and receptacles are joined together to form the lighting assembly. For example, the width of the common prongs and slots can be slightly larger than the hot prongs and slots as shown in FIGS. 6 and 7, so that the common prongs do not fit into the hot slots. In addition, the twist-lock plugs 150 and outlets 160 can have a unique configuration that effectively prevents other tools, equipment, battery chargers, radios and the like from being plugged into the temporary lighting assembly 30. One manner of achieving a unique configuration is to position the ports 165, 166 of the female outlet 160 and mating prongs 155, 156 of the male plug 150 a quarter of an inch further from the center of the outlet or plug.

Figure 7B:
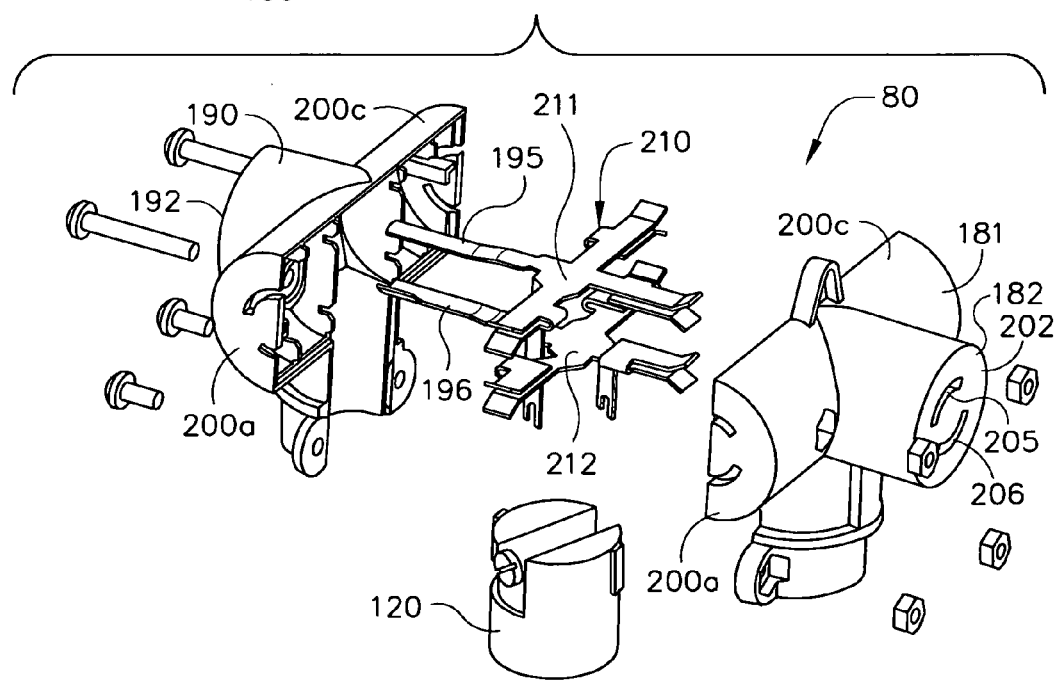
FIG. 7B is a perspective view of a two-prong embodiment of the receptacle.

The receptacle 80 has a housing 181 with a different overall shape, but includes similar basic surfaces such as side faces 82, and a top and a bottom, as shown in FIG. 7B. The housing 181 is formed by two separate halves joined together by screws and nuts. The front side 82 of each receptacle 80 includes an electrical input or male plug 190 with a flat face 192 and three outwardly projecting prongs 195 and 196. The common prong 196 has a locking finger 198 similar to the locking finger 58 of the male plug 150 of each stringer 40. The rear and two opposed sides 82 each have an electrical output or female outlet 200a, 200b or 200c with a flat face 202 and two inwardly projecting ports 205 and 206. In the embodiment shown in FIGS. 7A, 7B and 8, the locking mechanism between the plug 150 of the stringer 40 and one of the outlets 200a-c of the receptacle 80 is formed by the fingers 158 of the prongs 155 and 156 engaging the plastic housing 181. However, it should be apparent that the common ports 206 could have a locking notch similar to notch 107a, with each locking notch lockingly receiving one of the corresponding locking finger 158 or 198 to securely join the stringer 40 to the receptacle 80 when the two are twist locked together.

Figure 8:
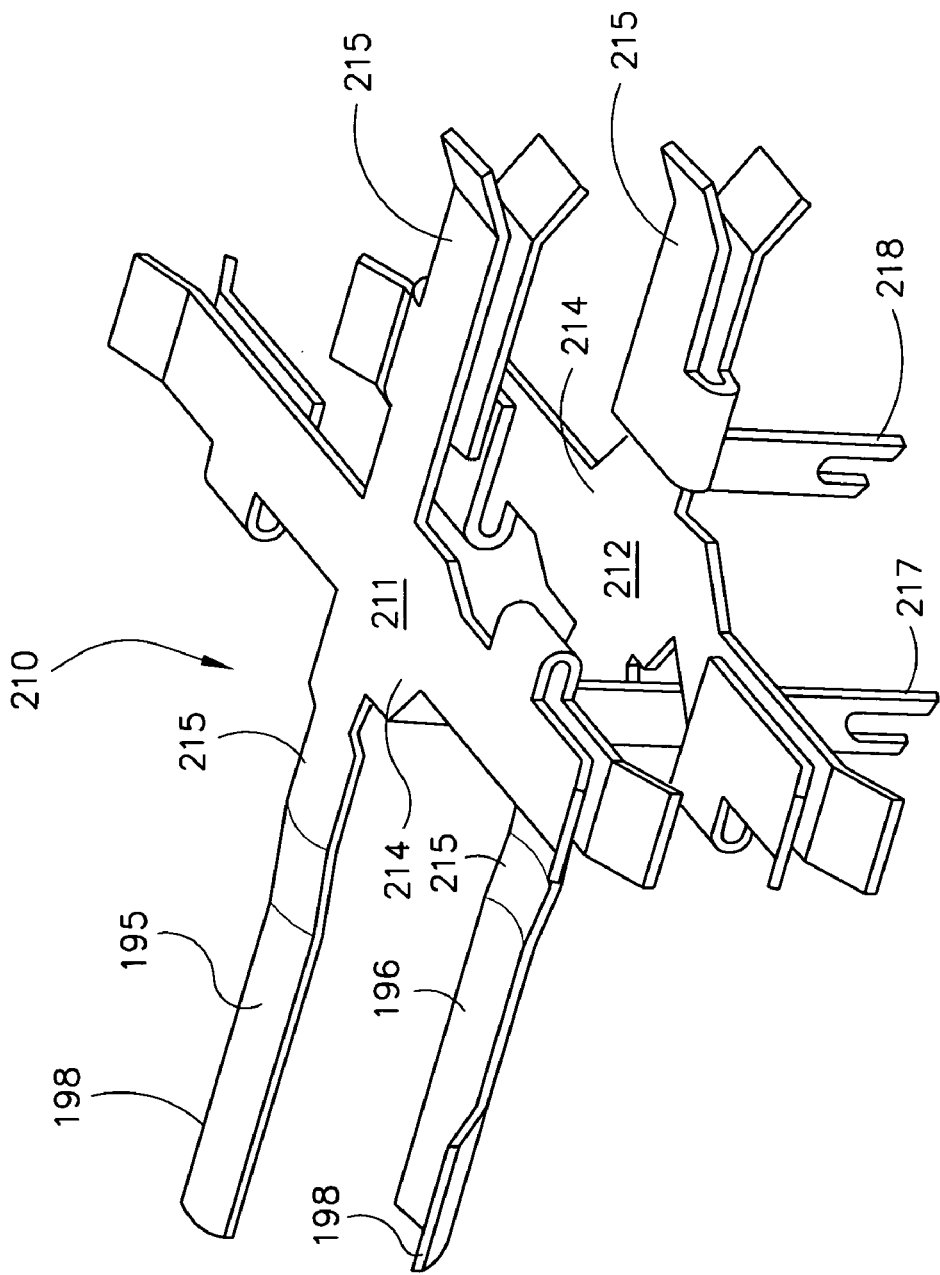
FIG. 8 is a perspective view of the hot and common bus assemblies of the two-prong embodiment of the receptacle.

The receptacle 80 include an internal bus assembly or buswork 210 as shown in FIG. 8. The buswork 210 has a hot bus 211 and a common bus 212. Each bus 211, 212 has a central portion 214 and four legs 215 that combine to form a generally X-shape. Each bus 211, 212 has one leg 215 that forms its male prong 195, 196, respectively. Each prong 195, 196 forms an arc about ⅜ inch from a central point on the face 192 of the receptacle 80 with the locking finger 198 of the common prong 196 turning in toward the center. Each bus 211, 212 also has three legs 215 that form its three female ports 205, 206 or 207. Each female port 205, 206 and 207 defines an outer slot for receiving one of the male prongs 195 or 196. Each slot forms an arc about ⅜ inch from a central point, so that each slot receives one of the prongs 195 or 196 to form an electrical connection between the receptacle 80 and a stringer 40. As with the three-prong receptacle 80, the two-prong receptacle 80 has busses 211, 212 that are stacked one atop the other. The hot bus 211 is spaced and separated from its adjacent common bus 212 by the internal structure and slots of the housing 181, which are joined together after the busses 211 and 212 are properly positioned inside the housing. A hot lead or terminal 217 is located directly beneath and in electrical communication with the hot bus 211 and extends into the light socket 120. A common lead or terminal 218 is located directly beneath and in electrical communication with the common bus 212 and extends into the light socket 120.

Each stringer 40 and receptacle 80 has a plug 150 or 190 with similarly oriented prongs 155, 156 or 195, 196 as shown in FIGS. 6, 7A and 7B. Each stringer 40 and receptacle 80 also has outlets 160 or 200 with similarly oriented ports 165, 166 or 205, 206. Each of the plugs 195, 196 and ports 205, 206 is spaced a common distance of about ⅜ inch from a center point. Each face 192 or 202 has, its hot plug 195 or port 205 at top center, and its common plug 196 or port 206 rotated 180°. The plug 150 of each stringer 40 can be twist locked and firmly joined to any outlet of any receptacle 80. The outlet 160 of each stringer 40 can be twist locked and firmly joined to the plug 190 of any receptacle 80.

As in the three-prong embodiment, the socket 120 of the receptacle 80 has contacts (not shown) that electrically connect the hot and common terminals or leads 217 and 218 of the receptacle 80 with the light bulb 16. Electric power enters the receptacle 80 through its plug 190 as best shown in FIG. 6. This electric power is sent to operate the light bulb 16 in that receptacle 80 or distributed to other sections 32 of the assembly 30 via the outlets 200a-c of the receptacle.

Sections 30 of the two-prong embodiment of the assembly 30 are joined together in an electrically linked manner. The stringer 40 and receptacle 80 of each section 32 combine to form a positive or hot line and a neutral line. The hot line is formed by a wire 145, prong 155 and port 165 of the stringer 40 and a corresponding prong 195, port 205 and terminal 217 of its corresponding receptacle 80. The neutral line is formed by another wire 146, prong 156 and port 166 in the stringer 40 and a corresponding prong 196, port 206 and terminal 218 in the receptacle 80. When the prongs 155, 156 of one stringer 40 are plugged into the ports 205, 206 of one of the female outlets 200a-c of an adjacent receptacle 80, the hot lines of the adjacent sections are electrically connected to form a continuous hot line, and the neutral lines of the adjacent sections are electrically connected to form a continuous neutral line. The continuous hot and neutral lines run in parallel. The hot and neutral lines are electrically connected via the light bulbs 16 and sockets 120 of each section 32. The voltage drop across each socket 120 in the assembly 30 is substantially the same as the voltage drop across the outlet of the pedestal 7. The electric circuit formed by the assembly 30 is complete when one or more bulbs 16 are screwed into their respective sockets 120. Electric current passes from the hot port of the pedestal 7, through the continuous multi-branch hot line of the assembly 30, across the sockets 120 and bulbs 16, into the continuous multi-branch common line of the assembly, and back to the neutral port of the pedestal. The amount of electric current flowing through each bulb 16 is substantially the same so that each light bulb consumes substantially the same amount of electric power and generates substantially the same amount of light.

Installing the Modular Temporary Lighting Assembly

Although the processes of installing the modular temporary lighting assembly 30 should be readily understood by those of skill in the art based on the above disclosure, the following is provided to assist the reader in understanding two possible procedures for installing the assembly. The modular temporary lighting assembly 30 is installed inside a building 5 after its outer walls 8 and roof have been erected and the temporary electric service box 6 and pedestals 7 have been installed. In both procedures, the first step is to provide the construction site with an appropriate number or quantity of individual stringers 40, receptacles 80, sockets 120, cages 130 and bulbs 16. The stringers 40 can all have a common length such as ten feet, or the stringers 40 and 41 can be provided in a variety of different lengths, such as five and ten foot lengths as discussed above.

In one process, the worker secures each of the receptacles 80 to the ceiling or other supporting surface of the building 5, taking care to space the receptacles no further apart than the length of one of the stringers 40 or 41. The receptacles 80 are then electrically connected by the stringers 40. One stringer 30 is connected between two adjacent receptacles 80. The light bulbs 16, sockets 120, and cages 130 can be secured to the receptacles 80 either before or after the receptacles are hung in place, or before or after the stringers 40 are secured to the receptacles, which ever is more convenient to the worker given the height of the ceiling, the equipment and scaffolding available, the circumstances at the cite and the preference of the vendor or worker. The stringer 40 that connects the assembly 30 to the temporary pedestal 7 is typically not plugged into the pedestal until after the rest of the assembly is installed. An alternate light source or the sunlight passing through the doors or windows of the building as in FIG. 2A is used to hang and electrically connect the lighting assembly 30 together in this manner.

In another process, the worker assembles and secures one section 32 of the assembly 30 to the building 5 at a time. A first section 32 is secured to the building at a desired location, typically near the temporary pedestal 7 so that it can be immediately plugged in to provide lighting the area where the worker is located. A second section 32' is then secured to the building at a desired location within a stringer length of the first section 32. The plug 50', 150' of the second section 32' is plugged into one of the outlets 100a-c, 200a-c of the receptacle 80 of the first section 32 either before or after the receptacle 80' of the second section 32' is hung. A third section 32" is then secured to the building at a desired location within a stringer length of the first section 32 or second section 32'. The male plug 50", 150" of the third section 32" is plugged into the one of the outlets 100a-c or 100a-c', 200a-c or 200a-c' of the first or second sections 32 or section 32'. This process is repeated until the entire linear or multi-branch assembly 30 is complete. Throughout this process, the stringer 40 and receptacle 80 forming a given section 32 can be connected together before or after the receptacle for that section is secured to the building 5.

Rerouting the Modular Temporary Lighting Assembly

At appropriate times during the ongoing construction of the interior 9 of the building 5, the modular lighting assembly 30 can be rerouted or otherwise modified to meet the changing lighting needs inside the building as in FIG. 2B. One or more sections 32, branches 34 of the assembly 30, or the entire assembly itself, can be disconnected, moved and reconnected to form a modified linear or multi-branch routing 35' or a completely different routing. One or more sections 32 or branches 34 can also be removed from or added to the existing assembly 30. The ability to add to, subtract from or reroute all or a portion of the assembly 30 gives the assembly a great deal of flexibility to adapt to the changing lighting needs of a construction site. The process of modifying the rerouting 35' of the assembly 30 is accomplished using either of the two processes for installing and removing the assembly.

Removing the Modular Temporary Lighting Assembly

The process of removing the assembly 30 is similar to the reverse of either of the two above processes for installing the assembly. In one process, the worker first disconnects and removes the stringers 40 between adjacent receptacles 80. The permanent lighting system for the building 5 or an alternate lighting source is used at this time. The receptacles 80 are then removed. The light bulbs 16, sockets 120, and cages 130 can be left connected to or removed from the receptacles depending on the preference of the lighting contractor or worker. In another process, the worker disassembles and removes one section 32 of the assembly 30 at a time. Should any stringer 40 be intertwined with the permanent wiring 25-28 in the building 5 or otherwise be inhibited from removal due to the framing of the interior wall 9 or other permanent equipment 29 or components in the building 5, then that stringer is cut and discarded. The uncut or otherwise undamaged stringers 40 and receptacles 80 are saved for reuse.

While the invention has been described with reference to a preferred embodiment, it will be understood by those skilled in the art that various changes may be made and equivalents may be substituted without departing from the broad aspects of the invention.

I claim:

1. A modular temporary lighting assembly that provides electric power to a number of light bulbs to light an interior area of a building during construction, the building having a pedestal with at least one grounded electric outlet, said modular temporary lighting assembly comprising:

a plurality of electric stringers, each stringer having an elongated cord and opposed ends, each stringer having a male plug at one of said ends and a female outlet at said other end, said male plug having positive and negative prongs, and said female outlet having cooperating positive and negative ports, said cord electrically connecting each of said positive and negative prongs to said cooperating positive and negative port;

a plurality of electric receptacles, each receptacle having a male plug, two female outlets, and a socket for receiving one of the light bulbs, said male plug having positive and negative prongs, and each of said female outlets having cooperating positive and negative ports, said socket being electrically connected to said positive and negative prongs, and each of said positive and negative prongs being electrically connected to said cooperating positive and negative ports;

wherein said male plug of each receptacle is electrically plugged into said female outlet of a corresponding stringer, said corresponding stringers and receptacles forming a plurality of sections of said assembly; and, wherein said male plug of a first section is electrically connected to the outlet of the building, and said male plug of each of said subsequent sections is electrically connected to one of said female outlets of one of said plurality of sections in an electrically linked manner, wherein said stringers have a cord that is made of a relatively soft flexible material that can be cut, and wherein one of said plurality of stringers can be cut to remove said modular temporary lighting assembly from the building, and said plurality of receptacles and said uncut stringers remain undamaged for reuse.

2. The modular temporary lighting assembly of claim 1, and wherein said stringers and receptacles are selectively connectable to form a multi-branch routing.

3. The modular temporary lighting assembly of claim 2, and wherein said assembly meets or exceeds the requirement of National Electric Code Article 590 for Temporary Installation published 2008.

4. The modular temporary lighting assembly of claim 3, and wherein said assembly meets or exceeds the requirement of OSHA standard 29 C.F.R. 1926.405(a)(2) for Temporary Wiring published 2009.

5. The modular temporary lighting assembly of claim 3, and wherein the building has interior walls that divide the interior into distinct areas, and said multi-branch routing has two or more branches, each branch providing light to one of the distinct areas of the building.

6. The modular temporary lighting assembly of claim 1, and wherein said stringers are provided in different lengths.

7. The modular temporary lighting assembly of claim 1, and wherein each of said male plugs and said female outlets has a corresponding face with a center, and said prongs of each of said male plugs are spaced radially from said center of said corresponding face and equally apart relative to each other, and said ports of each of said female outlets are spaced radially from said center of said corresponding face and equally apart relative to each other, said male plugs being securable to said female outlets in a twist-lock type manner.

8. The modular temporary lighting assembly of claim 7, and wherein said prongs of each of said male plugs are spaced 180° apart, and said ports of each of said female outlets are spaced 180° apart.

9. The modular temporary lighting assembly of claim 1, and wherein the electric outlet of the building is provided by a temporary pedestal supplying 120 volts, and said stringers and receptacles are adapted for use with the temporary pedestal.

10. The modular temporary lighting assembly of claim 1, and wherein the temporary pedestal is equipped with a 20 amp breaker, and said stringers and receptacles are adapted to safely handle 20 amps.

11. The modular temporary lighting assembly of claim 1, and wherein each of said sections of said assembly includes at least one stringer.

* * * * *